(No Model.)
A. P. GROSS.
DOUGH RAISER.
No. 280,370. Patented July 3, 1883.
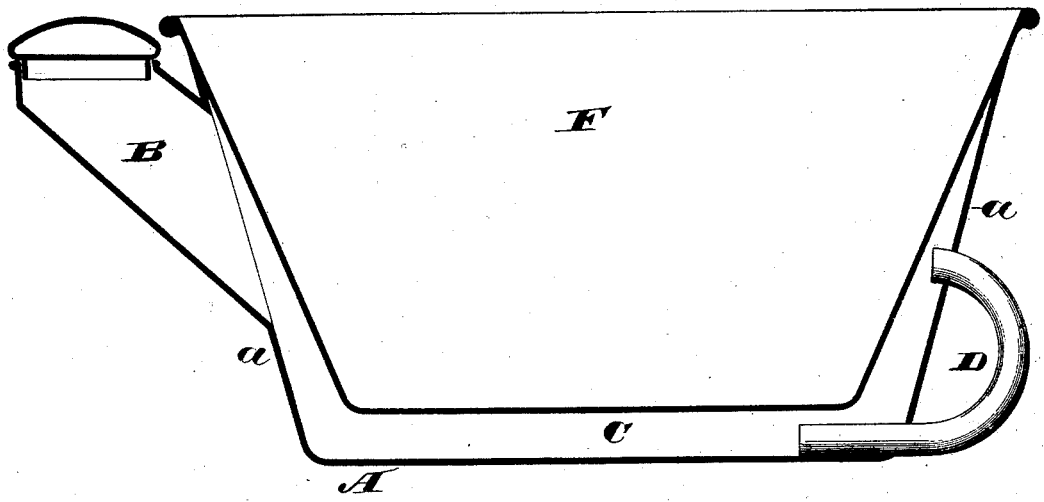

UNITED STATES PATENT OFFICE.

ALEXANDER P. GROSS, OF SAN FRANCISCO, CALIFORNIA.

DOUGH-RAISER.

SPECIFICATION forming part of Letters Patent No. 280,370, dated July 3, 1883.

Application filed January 18, 1883. (No model.)

*To all whom it may concern:*

Be it known that I, ALEXANDER P. GROSS, of San Francisco, in the county of San Francisco and State of California, have invented certain new and useful Improvements in Dough-Raisers; and I do hereby declare the following to be a full, clear, and exact description of the invention, such as will enable others skilled in the art to which it appertains to make and use the same.

My invention relates to an improvement in dough-raisers, the object of the same being to provide a device that will combine simplicity and economy in construction with durability and efficiency in use; and with these ends in view my invention consists in certain details in construction and combinations of parts, as will be more fully described, and pointed out in the claim.

The accompanying drawing represents a vertical sectional view of my improvement.

A represents a metallic vessel, of any suitable size, having flaring sides $a$, and provided with an outwardly-projecting spout, B, by means of which water is introduced into the water-chamber C. This spout B can be provided with a cap, if desired, and the upper end thereof terminates below the top of the inner vessel, so as to enable a cover or lid to lie down closely on the vessels without striking the said spout.

D is a curved heating-pipe, preferably made of copper, the opposite ends of which are secured to and terminate inside of the vessel A. The water in the vessel is allowed a free circulation through the pipe D, which latter can be heated by a lamp or any other suitable means. It will be apparent that this pipe D may be used as a handle to tilt the vessel, to discharge the water after the latter and the pipe cool. If desired, I can employ a thermometer in connection with the vessel; but when the device is simply adapted for family use it can be dispensed with. The inner vessel, F, is substantially as shown, being slightly larger at its upper edge than the vessel A, so as to rest within the said vessel A and be supported thereby. By this arrangement a space between the two vessels is formed, into which hot water is introduced through the spout B.

The operation of my device is as follows: The flour, in a dry state, is first placed within the vessel F, and hot water introduced under the said vessel until the chamber C is nearly full. The flour is allowed to dry for about fifteen or twenty minutes, and is then made into dough in the usual manner. These pans or troughs can be made of any size, and when used in a bakery it is better to employ the heating-pipe and thermometer before referred to. The two vessels are preferably disconnected from each other, and can be easily separated when it is desired to use them for other purposes; but they can be rigidly secured together, if so desired.

My invention is simple in construction, is durable and effective in use, and can be manufactured at a small initial cost.

Having fully described my invention, what I claim as new, and desire to secure by Letters Patent, is—

A dough-raiser consisting of an outer vessel having a spout, B, and a pipe, the latter having one of its ends projecting into the vessel near the bottom, and the other end projecting into said vessel above the bottom, said pipe being bent to adapt it for use as a handle when the raiser is not heated, and an inner vessel resting upon the upper edge of the outer vessel, and of the form described, whereby an annular water-space is left between the two vessels, substantially as set forth.

In testimony whereof I have signed this specification in the presence of two subscribing witnesses.

ALEXANDER P. GROSS.

Witnesses:
  GEORGE HODGES,
  J. L. FIELDS.